United States Patent
Nakayama

[19]
[11] Patent Number: 5,901,451
[45] Date of Patent: May 11, 1999

[54] TWO SIDED PRUNING SAW BLADE WITH COMPOUND CUTTING EDGES

[75] Inventor: Toshiro Nakayama, Wilmington, Calif.

[73] Assignee: Takagi Tools, Inc., Wilmington, Calif.

[21] Appl. No.: 08/916,344

[22] Filed: Aug. 22, 1997

[51] Int. Cl.$^6$ .................................................. B27B 21/00
[52] U.S. Cl. .................................. 30/502; 30/501; 83/835
[58] Field of Search ..................... 83/697, 835; 30/353, 30/356, 296.1, 355, 501–02

[56] References Cited

U.S. PATENT DOCUMENTS

| | | | |
|---|---|---|---|
| 296,241 | 4/1884 | Stansbury | 30/502 |
| 350,403 | 10/1886 | Van Ostrand | 30/502 |
| 522,749 | 7/1894 | Bedell | 30/502 |
| 700,617 | 5/1902 | Cobaugh | 30/502 |
| 709,857 | 9/1902 | Anderson | 30/502 |
| 770,094 | 9/1904 | McGill | 30/502 |
| 829,158 | 8/1906 | Keepfer | 30/502 |
| 865,348 | 9/1907 | Allison | 30/502 |
| 942,920 | 12/1909 | Martin | 30/355 |
| 3,680,610 | 8/1972 | Lindgren | 143/133 |
| 3,837,024 | 9/1974 | Saunders | 7/8.1 R |

Primary Examiner—M. Rachuba
Assistant Examiner—T. Anthony Vaughn
Attorney, Agent, or Firm—Nikaido Marmelstein Murray & Oram, LLP

[57] ABSTRACT

A two sided pruning saw blade has a top cutting edge used for making an undercut of a limb while the bottom cutting edge is used for regular pruning. Both the top cutting edge and the bottom cutting edge have a compound curve containing two radii of curvatures which are different from one another.

16 Claims, 1 Drawing Sheet

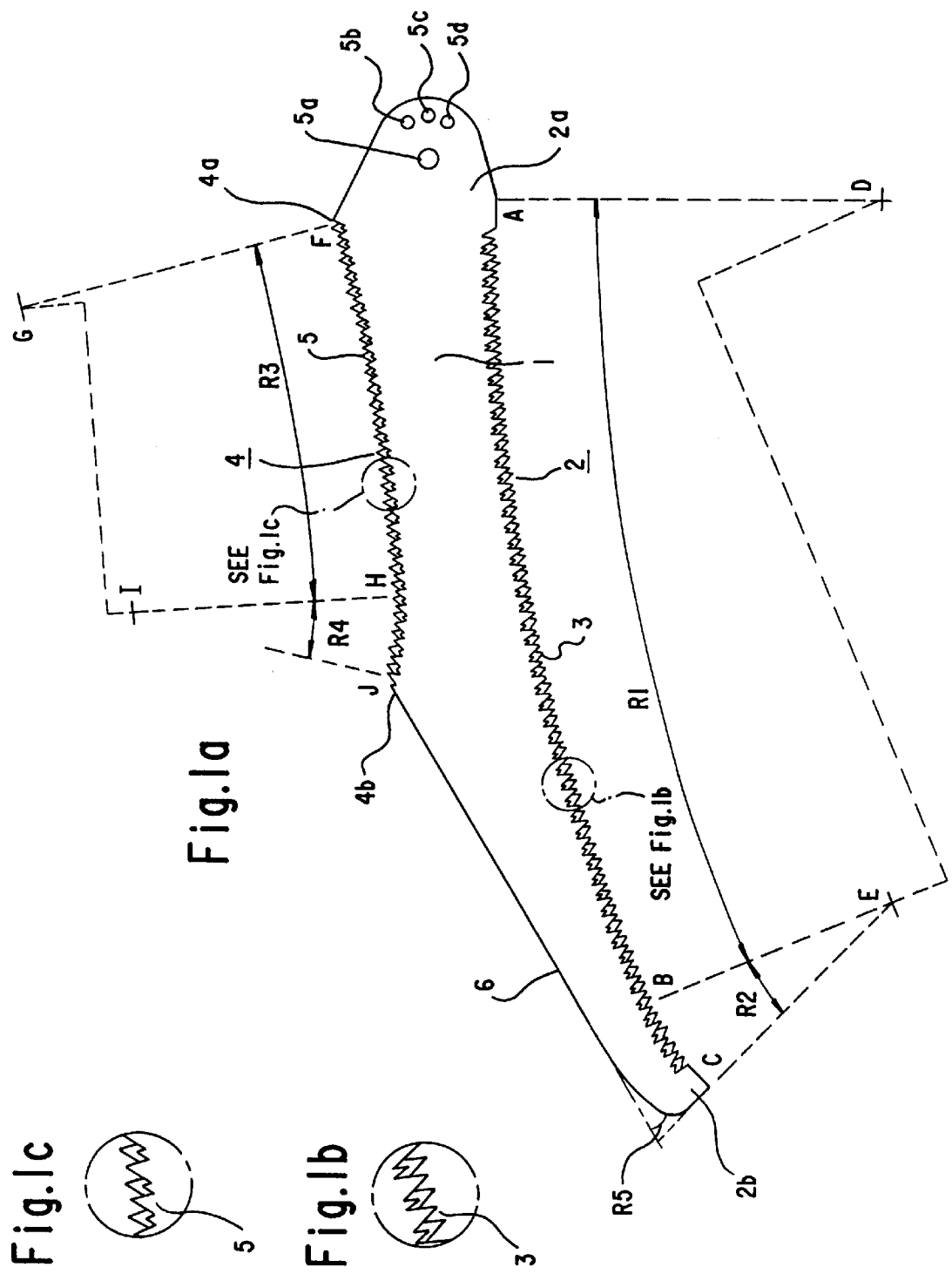

TWO SIDED PRUNING SAW BLADE WITH COMPOUND CUTTING EDGES

FIELD OF THE INVENTION

The present invention relates to an improved pruning saw blade and in particular to a two sided pruning saw blade having compound cutting edges.

BACKGROUND OF THE INVENTION

With a conventional pruning saw blade, the pruning saw blade contains a cutting edge on only one side of a blade main body. Therefore, when the saw blade is used to cut a limb or branch, as the limb is sawed from the top, the limb will sag under its own weight and will eventually fall down prior to the saw blade cutting the entire way through the limb. Therefore, the branch or limb will split which will injure the tree rather than if the limb were completely sawed through.

In addition, with a conventional pruning saw blade, if the saw blade becomes disengaged from the limb prior to completion of cutting the limb, it is often difficult to center the saw blade on the cut again, especially if the limb is high up.

SUMMARY OF THE INVENTION

The present invention is directed to a two sided pruning saw blade in which a top saw blade cutting edge is used to make an undercut of the limb while a bottom saw blade cutting edge is used for regular pruning.

Additionally, the present invention is directed to a compound cutting edge in which each cutting edge of the pruning saw blade contains two angles of curvature (i.e., a compound curve).

DESCRIPTION OF THE DRAWING

FIG. 1a shows the two sided pruning saw blade of the present invention.

FIG. 1b shows a detailed picture of the cutting teeth of the main blade cutting edge.

FIG. 1c shows a detailed picture of the cutting teeth of the top blade cutting edge.

DESCRIPTION OF THE PREFERRED EMBODIMENT

FIG. 1a shows the two sided pruning saw blade of the present invention. As shown in FIG. 1a, the pruning saw blade includes a main body 1. A main saw blade cutting edge or main blade 2 is provided for regular pruning. The main saw blade cutting edge 2 extends along the majority of the length of the bottom edge of the main body 1. However, the length of the cutting edge 2 may vary. The main blade 2 includes a plurality of teeth 3 extending between a base end 2a and a tip 2b of the bottom edge of the main body 1. As shown in FIG. 1b, the teeth 3 are three edged teeth. Eight teeth per inch are provided along the main blade cutting edge 2. However, the number of edges of the teeth and the number of teeth per inch may vary. Furthermore, as shown in FIG. 1b, the teeth cut when the pruning saw blade is pulled. However, the teeth may be designed to cut when the pruning saw blade is pushed.

As shown in FIG. 1a, the main blade 2 contains a compound cutting edge. In particular, a radius of curvature of the main cutting edge 2 from point A to point B has a first radius of curvature R1 (i.e., that is defined by angle ADB) while the radius of curvature of the main cutting edge 2 from point B to point C has a second radius of curvature R2 (i.e. defined by angle BEC). The second radius of curvature is different from the first radius of curvature R1 due to point D being located at a different location than point E (i.e., the center of curvature of R1 is different from R2). In other words, the compound curve ABC is made from two internally tangent circles, one circle having a radius R1 and the second circle having a radius R2. The use of the two radii of curvature (i.e., compound curve) for the main blade 2 creates a compound cutting edge which causes point C to rise relative to the remaining part of the curve A to B (i.e., point C rises relative to extending the first radius of curvature to the tip end 2b).

As shown in FIG. 1a, the first radius of curvature R1 has an angle of approximately 23 degrees as measured by angle ADB. Furthermore, the second radius of curvature has an angle of approximately 23 degrees as measured by angle BEC. However, these angles are only exemplary. The angle ADB, and the angle BEC can increase or decrease independently of one another. In other words, the angles may be the same or may be different from one another and may be larger or smaller than the 23 degree angles shown in FIG. 1a. The important feature is that there are two radii of curvatures formed along the main blade 2 (i.e., a compound curve is formed). Furthermore the two curvatures are measured from two different points D and E (i.e., the second radius of curvature is measured from a different point R100, i.e., point E, which is different from the first point 800 i.e., point D).

As shown in the drawing, point E is located at a predetermined distance R100 from point C which is approximately one-eighth the distance that point 800 (i.e., point D) is located from point A of the blade. However, these distances are exemplary. As shown in FIG. 1a the first radius of curvature R1 extends along a majority of the bottom or main cutting edge of the main blade 2 and as shown in FIG. 1a represents approximately 90% of the main cutting edge 2. Radius R2 is formed along the remaining 10% of the main cutting edge of the main blade 2. However, the important feature of the present invention is that the first radius of curvature R1 is formed over at least 50% of the main cutting edge of the main blade 2 and preferably formed over a length greater than 60% of the main cutting edge and more preferably formed over 80–90% of the length of the main cutting edge 2.

In addition, as shown in FIG. 1a, the teeth 3 are provided along only part of the second radius of curvature R2 and are not provided along the tip 2b. However, the tip 2b is contained within the radius of curvature R2. Furthermore, the teeth may extend along the entire radius of curvature R2.

The use of the compound cutting edge having the two different radii of curvature is important for pruning. In particular, the second radius of curvature acts as a hook or stopping means to prevent the pruning saw blade from slipping off the limb as the limb is cut. In particular, in the prior art, as the pruning saw blade is used to cut a branch, the saw blade could slide off the branch. However, with the compound curve of the present invention, the second radius of curvature R2 at the tip end 2b of the main blade 2 will prevent the main blade 2 from sliding off the branch and will act as a hook. Thus, pruning becomes easier with the pruning saw blade of the present invention.

As shown in FIG. 1a, the pruning saw blade also contains a top saw blade cutting edge or secondary blade 4 on the top edge portion of the main body 1. As shown in FIG. 1a, the secondary blade 4 includes a plurality of teeth 5 extending between the top base end 4a and an intermediate point 4b of the main body 1. However, the length of the top cutting edge is variable and may extend well beyond the intermediate point 4b, and may extend the entire length of the top edge portion of the main body 1. As shown in FIG. 1c, the teeth 5 are two edged teeth. Eight teeth per inch are provided along the top blade cutting edge 4. However, the number of edges of the teeth and the number of teeth per inch may vary. Furthermore, as shown in FIG. 1c, the teeth cut on a pull of the pruning saw blade. However, the teeth may be designed to cut on a push of the pruning saw blade.

As shown in FIG. 1a, the top secondary blade 4 represents a compound cutting edge similar to that shown for the main blade 2. In particular, the radius of curvature of the top cutting edge 4 from point F to point H (i.e., the radius of curvature defined by an angle FGH) has a third radius of curvature R3 while the radius of curvature of the top cutting edge 4 from point H to point J (i.e., the radius of curvature defined by an angle HIJ) has a fourth radius of curvature R4. The fourth radius of curvature R4 is different from the third radius of curvature R3 due to point G being located at a different location than point 1. In other words, the compound curve FHJ is made from two internally tangent circles, one circle having a radius R3 and another circle having a radius R4. The use of the two radii of curvature (i.e., compound curve) for the secondary blade 4 creates a compound cutting edge similar to that described above for the main blade 2.

The third radius of curvature R3 as measured by angle FGH and as shown in FIG. 1a is approximately 10.58 degrees. Similarly, the fourth radius of curvature R4 as measured by angle HIJ has an angle of approximately 10.4 degrees. Similar to the main blade 2, the important feature of the present invention is that points G and I are located at different predetermined locations 800', R100' to create the compound cutting edge having the two different radii of curvatures R3 and R4 9 (i.e., the center of curvature of R3 is different from R4 thus forming the compound curve). Similar to the main cutting edge 2, these radii of curvatures may increase or decrease independently of one another from that shown in FIG. 1a and may be different from one another or may be the same. The important feature again, is that the two radii of curvatures are measured from two different points G and I which cause the point J to rise relative to the remaining part of the curve H to F.

As shown in the drawing, point I is located at a predetermined distance R100' from point J which is approximately one-eighth the distance 800' that point G is located from point F of the blade. However, these distances are exemplary. It should be noted that the third radius of curvature R3 extends along a majority of the top cutting edge 4 of the top edge portion of the main body 1 and as shown in Fig. 1a represents approximately 90% the top cutting edge. The length of the top cutting edge, as shown in Fig. 1a, extends to an intermediate point 4b, but may be longer. The third radius of curvature shown in FIG. 1a is 90% of the length of the top cutting edge even though the top cutting edge 4 may be shorter than the top edge portion of the main body 1. Radius R4 is formed along the remaining 10% of the top cutting edge of the secondary blade 4 as shown in FIG. 1a. However, the important feature of the present invention is that the third radius of curvature is formed over 50% of the top cutting edge of the secondary blade 4 and preferably formed over greater than 60% of the top cutting edge and more preferably formed over 80–90% of the top cutting edge.

The secondary blade 4 is used for undercutting of a limb. In particular, the secondary blade 4 is used to undercut the limb prior to regular pruning. Subsequent to undercutting the limb with the secondary blade 4, the main blade 2 is used for regular pruning. Thus, in the present invention, because the limb is undercut, the limb will not split when the top cut cuts sufficiently through the limb that the weight of the limb causes the limb to snap off. Therefore, a clean cut will result and the limb of the tree or bush will not split so that there will be no injury to the plant.

The pruning blade also includes at its base end 2a a plurality of holes 5a, 5b, 5c, 5d for attaching the main body 1 to a holder (not shown). The location and placement of these holes will vary dependency upon the holder that the main body 1 is to be inserted into. Similarly, the shape of the base end 2a will vary depending on the type of holder the main body 1 is inserted into.

The tip end 2b of the main body 1 includes a fifth radius of curvature R5 which is offset from the straight line edge 6 of the top edge of the main body 1. However, the tip end 2b of the main body can vary in shape. It should be noted that the top edge portion of the main body 1 includes the edge 6 and the secondary cutting edge 4. Furthermore, although two radii of curvature are described for the compound curve, the compound curve may have three or more radii of curvature.

Although the embodiments of the present invention have been described in detail, it will be understood that the present invention is not limited to the above-described embodiments, and various modifications may be made without departing from the spirit and scope of the invention defined in the claims.

I claim:

1. A pruning saw blade comprising:
   a main body;
   a bottom cutting edge formed on a bottom edge of the main body; and
   a top cutting edge formed on a top edge of the main body, wherein both said bottom and top cutting edge are formed as a compound curve from internally tangent circles, each formed from at least two circles having different radii.

2. A pruning saw blade according to claim 1, wherein one of the radii is formed over 80% of the bottom cutting edge.

3. A pruning saw blade according to claim 1, wherein one of the radii extends over 80% of the top cutting edge.

4. A pruning saw blade according to claim 1, wherein one of the radii of the top cutting edge extends over 80% of the top cutting edge and wherein one of the radii of the bottom cutting edge extends over 80% of the bottom cutting edge.

5. A pruning saw blade according to claim 1, wherein centers of the radii of the compound cutting edge are located at different predetermined distances from said main body.

6. A pruning saw blade according to claim 1, wherein said bottom cutting edge and said top cutting edge are each formed with a plurality of teeth.

7. A pruning saw blade according to claim 1, wherein said bottom cutting edge is for primary cutting and said top cutting edge is for preliminary cutting.

8. A pruning saw blade according to claim 1, wherein said top cutting edge extends over 50% of a top edge of the main body.

9. A pruning saw blade comprising:
  a main body;
  a bottom cutting edge formed on a bottom edge of the main body, said bottom cutting edge having a compound curve formed from internally tangent circles, and
  a top cutting edge formed on a top edge of the main body, said top cutting edge having a compound curve formed from internally tangent circles.

10. A pruning saw blade according to claim 9, wherein a first radius of the compound curve of the bottom cutting edge is formed over 80% of the bottom cutting edge.

11. A pruning saw blade according to claim 9, wherein a first radius of the compound curve of the top cutting edge extends over 80% of the top cutting edge.

12. A pruning saw blade according to claim 9, wherein a first radius of the compound curve of the top cutting edge extends over 80% of the top cutting edge and wherein a first radius of the compound curve of the bottom cutting edge extends over 80% of the bottom cutting edge.

13. A pruning saw blade according to claim 9, wherein centers of the circles of the compound curves are located at different predetermined distances from said main body.

14. A pruning saw blade according to claim 9, wherein said bottom cutting edge and said top cutting edge are each formed with a plurality of teeth.

15. A pruning saw blade according to claim 9, wherein said bottom cutting edge is for primary cutting and said top cutting edge is for preliminary cutting.

16. A pruning saw blade according to claim 9, wherein said top cutting edge extends over 50% of the top edge of the main body.

* * * * *